United States Patent
Herrnberger

(10) Patent No.: US 11,984,828 B2
(45) Date of Patent: May 14, 2024

(54) METHOD FOR DETERMINING AT LEAST ONE CURRENT FED TO AN ELECTRICAL MACHINE BY MEANS OF A FEEDBACK SIGNAL, DRIVE SYSTEM AND MOTOR VEHICLE

(71) Applicant: Bayerische Motoren Werke Aktiengesellschaft, Munich (DE)

(72) Inventor: Maximilian Herrnberger, Oberhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 226 days.

(21) Appl. No.: 17/730,286

(22) Filed: Apr. 27, 2022

(65) Prior Publication Data
US 2022/0385221 A1 Dec. 1, 2022

(30) Foreign Application Priority Data
May 31, 2021 (DE) ...................... 10 2021 113 964.3

(51) Int. Cl.
*G01B 7/30* (2006.01)
*B60R 16/03* (2006.01)
*H02P 23/14* (2006.01)

(52) U.S. Cl.
CPC .............. *H02P 23/14* (2013.01); *B60R 16/03* (2013.01)

(58) Field of Classification Search
CPC ................................... H02P 23/14; H02P 6/18
See application file for complete search history.

(56) References Cited

U.S. PATENT DOCUMENTS

| | | | |
|---|---|---|---|
| 2004/0032230 A1* | 2/2004 | Schwarz | H02P 6/18 318/400.01 |
| 2009/0284204 A1* | 11/2009 | Colby | H02P 23/14 318/490 |
| 2012/0229119 A1* | 9/2012 | Leidhold | H02P 6/18 324/71.1 |

FOREIGN PATENT DOCUMENTS

| | | |
|---|---|---|
| DE | 11 2018 002 013 T5 | 1/2020 |
| EP | 3 855 190 A1 | 7/2021 |

OTHER PUBLICATIONS

German-language Search Report issued in German Application No. 10 2021 113 964.3 dated Jan. 12, 2022, with partial English translation (10 pages).

* cited by examiner

*Primary Examiner* — Muhammad S Islam
(74) *Attorney, Agent, or Firm* — Crowell & Moring LLP

(57) ABSTRACT

A method for determining at least one current fed to an electrical machine of a drive system includes predefining a carrier frequency of the at least one current fed to the electrical machine, detecting an electromechanical feedback signal dependent on the at least one current, at a link circuit capacitor of the drive system, identifying a signal component associated with the at least one current in the feedback signal on the basis of the predefined carrier frequency, and determining the at least one current fed to the electrical machine on the basis of the signal component.

20 Claims, 1 Drawing Sheet

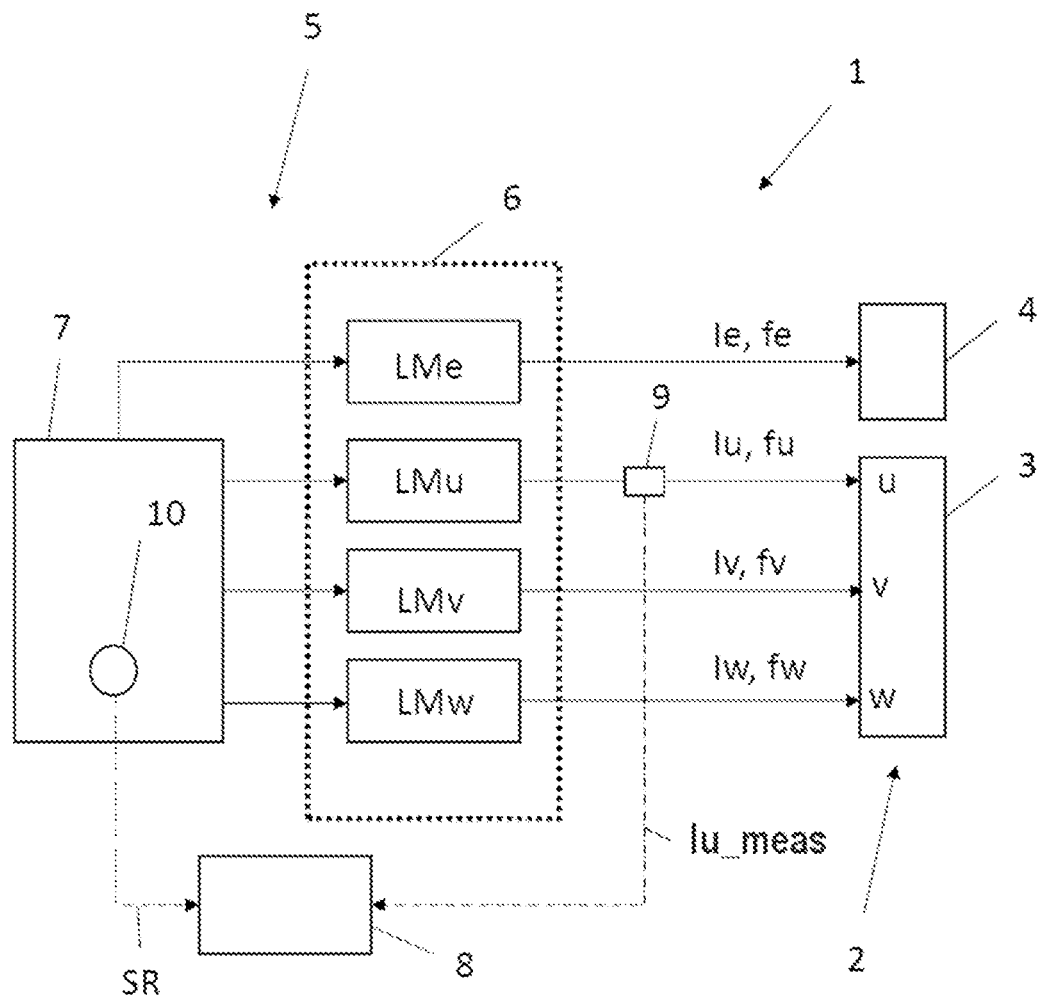

METHOD FOR DETERMINING AT LEAST ONE CURRENT FED TO AN ELECTRICAL MACHINE BY MEANS OF A FEEDBACK SIGNAL, DRIVE SYSTEM AND MOTOR VEHICLE

CROSS REFERENCE TO RELATED APPLICATION

This application claims priority under 35 U.S.C. § 119 from German Patent Application No. DE 10 2021 113 964.3, filed May 31, 2021, the entire disclosure of which is herein expressly incorporated by reference.

BACKGROUND AND SUMMARY

The invention relates to a method for determining at least one current fed to an electrical machine of a drive system. The invention additionally relates to a drive system and to a motor vehicle.

Interest is presently being directed at drive systems for electrically drivable motor vehicles comprising at least one electrical machine for driving the motor vehicle. For controlling the electrical machine for providing a specific torque, the electrical machine is supplied with current via a link circuit comprising power electronics. These currents are phase currents, for example, which are fed to phases of a stator of the electrical machine in order to provide a torque-specific rotating field via the power electronics. In the case of a separately excited machine, a current in the form of an excitation current is also fed to a rotor of the electrical machine.

For correct regulation of the electrical machine and of the power electronics, the currents fed to the machine have to be detected. For this purpose, it is known from the prior art to measure the currents by means of current sensors. For a three-phase electrical machine, at least two current sensors are required for detecting the phase currents. Such current sensors may be Hall sensors that are evaluated by the control device. A separately excited machine necessitates an additional current sensor for monitoring the excitation current. Current sensors are expensive and structural space-intensive, particularly in combination with tape-wound toroidal cores in the case of Hall sensors. Since the current sensors are usually situated on a circuit board and positioned jointly with the circuit board, there may additionally be problems with tolerances, particularly if tape-wound toroidal cores are dispensed with.

It is an object of the present invention to provide a cost-effective and space-saving solution for determining currents that are fed to an electrical machine of a drive system.

This object is achieved according to the invention by means of a method, a drive system and a motor vehicle having the features in accordance with the present disclosure. Advantageous embodiments of the invention are also the subject matter of the description and of the FIGURE.

A method according to the invention serves for determining at least one current fed to an electrical machine of a drive system. In the method, a carrier frequency of the at least one current fed to the electrical machine is predefined. This is then followed by detecting an electromechanical feedback signal, dependent on the at least one current fed, at a link circuit capacitor of the drive system and identifying a signal component associated with the at least one current fed in the feedback signal on the basis of the predefined carrier frequency. The at least one current fed to the electrical machine is determined on the basis of the signal component.

The invention additionally includes a drive system for a motor vehicle comprising at least one electrical machine, a link circuit having a link circuit capacitor, the link circuit being coupled to the at least one electrical machine, and a control device designed to regulate at least one current fed to the electrical machine via the link circuit, and to carry out a method according to the invention. The electrical machine functions in particular as a drive machine for the motor vehicle. The electrical machine can be embodied for example as a permanent magnet synchronous machine (PSM) or as a separately excited or current-excited synchronous machine (SSM). The electrical machine has a stator and a rotor mounted rotatably in relation to the stator. The stator has, for example three or six, stator phases or phase windings, to which currents in the form of phase currents are fed in order to generate a torque-specific rotating magnetic field. In the case of a current-excited machine, the rotor has an excitation winding, to which a current in the form of an excitation current is fed. In this case, the current is provided in particular by an electrical energy store of the drive system and fed to the electrical machine via the link circuit. The link circuit comprises power electronics connected to the electrical machine on the output side. Moreover, the link circuit comprises a link circuit capacitor connected to the power electronics on the input side.

For the purpose of drive regulation, the currents fed to the stator windings and, in the case of a separately excited machine, to the excitation winding of the rotor are detected. At least one of the currents is determined on the basis of an electromechanical feedback caused in particular by harmonics of the currents at the link circuit capacitor. As the at least one current, for example, an excitation current for energizing the rotor of a machine of the drive system, the machine being embodied as a separately excited machine, and/or at least one phase current for energizing a stator phase of the stator of the electrical machine are determined on the basis of the feedback signal. For this purpose, the electromechanical feedback signal is detected at the link circuit capacitor. By way of example, an acceleration of at least one component of the link circuit capacitor and/or a surface velocity of at least one component of the link circuit capacitor and/or a displacement of at least one component of the link circuit capacitor and/or a sound emitted by the link circuit capacitor are/is detected as the electromechanical feedback signal. The at least one component can be for example a capacitor plate of the link circuit capacitor, a housing of the link circuit capacitor or a component of a wound link circuit capacitor. For this purpose, the drive system can have a sensor arranged at the link circuit capacitor which is configured in particular as an acceleration sensor and/or as a microphone. The harmonics cause Coulomb forces at the link circuit capacitor, which can be detected by means of the sensor.

In order to be able to identify or filter that signal component in the feedback signal which is generated by the current to be determined, the predefined carrier frequency of the current to be determined is used. This carrier frequency is, in particular, the frequency used to control that power module of the power electronics of the link circuit which provides the current to be determined for the electrical machine on the output side. An excitation with this carrier frequency or with a multiple of the carrier frequency is effected at the link circuit capacitor on account of the feedback. In addition, DC and AC voltage components can be separated from one another by way of the total harmonic distortion. In this case, the carrier frequency of the current to be determined is predefined in such a way that it is not equal to and not an integer multiple of a carrier frequency of another current fed to the electrical machine. In the case where the excitation current is intended to be determined by means of the feedback signal, this can be fulfilled particularly simply since the carrier frequency of the excitation current is usually different than the carrier frequency of the phase currents. In the case where at least one of the phase currents is intended to be determined by means of the feedback signal, then for this phase current a carrier frequency is predefined which is different than the carrier frequency of the other phase currents. The current can then be determined from the signal component detected at the carrier frequency of the current to be determined. For this purpose, for example, a model of the link circuit can be predefined and stored in the control device. The relationship between the currents at the different carrier frequencies and the feedback or excitation at the link circuit capacitor is defined on the basis of this model.

The method has the advantage that a number of cost-intensive and structural space-intensive current sensors can at least be reduced.

Particularly preferably, at least two currents fed to the electrical machine are determined, different carrier frequencies being predefined for the at least two currents, such that the signal component associated with the respective current is identified in the feedback signal on the basis of the respective carrier frequency. By way of example, all of the currents can be determined by means of the feedback signal at the link circuit capacitor. Current sensors can thus be completely dispensed with. Since excitations with the carrier frequencies or with a multiple of the carrier frequencies of the currents are effected at the link circuit capacitor on account of the feedback, the signal components caused by the currents can be identified on the basis of the specific carrier frequency of the currents. In this case, the carrier frequencies are predefined in particular such that they are not an integer multiple of one another.

In one development of the invention, at least one phase current is additionally measured by means of a current sensor and is compared with the phase current determined on the basis of the feedback signal. The drive system can comprise a current sensor, for example, which is arranged on the output side at one of the power modules and can measure the current of a phase. By means of this current sensor, the model of the link circuit can be validated or optionally calibrated.

It can be provided that a first phase current is measured by means of a current sensor a second phase current is determined by means of the feedback signal and a third phase current is both calculated from the first phase current and the second phase current and determined by means of the feedback signal and compared with the calculated phase current. This embodiment is based on the insight that in the case of a star connection of the stator phases, the phase currents add up to zero. Given two known phase currents, therefore, the third phase current can be calculated. In order to validate the model of the link circuit, one of the phase currents is both calculated from the other two known phase currents and determined by means of the feedback signal. In the case of a deviation of the calculated and determined profiles of the phase current, the model can be calibrated.

The invention additionally includes a motor vehicle comprising a drive system according to the invention. The motor vehicle is, in particular, an electrified motor vehicle in the form of an automobile and comprises the at least one electrical machine as a drive machine or traction machine.

The embodiments presented with regard to the method according to the invention and their advantages are applicable, mutatis mutandis, to the drive system according to the invention and to the motor vehicle according to the invention.

Further features of the invention are evident from the claims, the FIGURE and the description of the FIGURE. The features and feature combinations mentioned above in the description and also the features and the feature combinations mentioned below in the description of the FIGURE and/or shown solely in the FIGURE are usable not only in the combination respectively indicated but also in other combinations or by themselves.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a schematic illustration of a drive system for a motor vehicle in accordance with various embodiments.

DETAILED DESCRIPTION OF THE DRAWINGS

The invention will now be explained in greater detail on the basis of a preferred exemplary embodiment and with reference to the drawing. The sole FIGURE, FIG. 1, shows a schematic illustration of one embodiment of a drive system 1 for a motor vehicle. The drive system 1 comprises an electrical machine 2 comprising a stator 3 and a rotor 4. The stator 3 has three phases u, v, w, to which a respective current in the form of a phase current Iu, Iv, Iw is fed for the purpose of drive regulation. The electrical machine 2 is embodied here as a separately excited machine, such that a current in the form of an excitation current Ie is also fed to the rotor 4 for the purpose of drive regulation. The drive system 1 additionally comprises a link circuit 5 comprising power electronics 6 and also a link circuit capacitor 7 connected to the power electronics 6. The link circuit capacitor 7 is electrically connected in particular to an electrical energy store (not shown here) of the drive system 1. The power electronics 6 comprise a plurality of power modules LMe, LMu, LMv, LMw connected to the rotor 4 and the stator phases u, v, w. The power modules LMu, LMw, LMv convert a current provided by the electrical energy store and smoothed via the link circuit capacitor 7 into the, in particular sinusoidal, phase currents Iu, Iv, Iw, which cause a rotating field in the stator 3. The power module LMe is an excitation circuit that feeds to the rotor 4 the current Ie for generating a magnetic rotor field.

For the purpose of correct drive regulation, the currents Ie, Iu, Iv, Iw are detected and processed by a control device 8 of the drive system 1. For this purpose, the drive system 1 here comprises a current sensor 9, for example a Hall sensor, which measures the current Iu of the phase u. The currents Ie, Iu, Iv, Iw cause an excitation at the link circuit capacitor 7. This excitation is measured as an electromechanical feedback signal SR at the link circuit capacitor 7. For this purpose, a sensor 10 is arranged at the link circuit capacitor 7. The sensor 10 can be a microphone or an acceleration recorder that measures a sound emitted by the link circuit capacitor 7 or an acceleration of at least one capacitor plate of the link circuit capacitor 7 as the feedback signal SR. The sensor 10 can be arranged for example at a housing of the link circuit capacitor 7.

The mechanical excitation at the link circuit capacitor 7 that is caused by the phase current Iu of the phase u is measured at a predefined carrier frequency fu or n*fu of the current Iu. From this measurement signal Iu_meas, it is possible to derive a feedback by filtering that signal component from the feedback signal SR which corresponds to the current Iu on the basis of the known carrier frequency fu (or a multiple thereof). The higher the phase current Iu, the higher the excitation at the link circuit capacitor 7 at the frequency fu. On the basis of this signal component, the current Iu can be determined for example by means of a predetermined model of the link circuit capacitor 7 stored in the control device 8. This current Iu determined by means of the feedback signal SR can be compared with the current Iu_meas measured by the current sensor 9, for the purpose of validation and optionally calibration of the model.

In order then to be able to ascertain the currents Iv, Iw, Ie, in particular without further current sensors, mutually different carrier frequencies fv, fw, fe are predefined for these currents, such that the associated signal components are filterable from the feedback signal SR. In other words, if the excitation at the link circuit capacitor 7 is then measured at fv, fw, fe or n*fv, n*fw, n*fe, the other phase currents Iv, Iw, Ie can be deduced. Current sensors can be saved as a result. The excitation in the link circuit capacitor 7 itself is triggered by DC components and AC components. Since the excitation at 2*fn, for example, is driven only by AC components, it is possible to determine the total harmonic distortion as the DC to AC ratio. Since the excitation takes place at different frequencies fe, fu, fv, fw, the electrical and mechanical behavior of the link circuit capacitor 7 is relevant. This influence can be compensated for in the predetermined, offline-optimized model. The difference in phase angle between the feedback signal SR and the current signal Iu_meas measured by the current sensor 9 of the phase u can provide information here since the phase difference determines the distance with respect to the resonant frequency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining at least one current fed to an electrical machine of a drive system, the method comprising:
   predefining a carrier frequency of the at least one current fed to the electrical machine;
   detecting an electromechanical feedback signal dependent on the at least one current at a link circuit capacitor of the drive system;
   identifying a signal component associated with the at least one current in the feedback signal on a basis of the predefined carrier frequency; and
   determining the at least one current fed to the electrical machine on the basis of the signal component.

2. The method according to claim 1, further comprising:
   detecting, as the electromechanical feedback signal, an acceleration of at least one capacitor plate of the link circuit capacitor.

3. The method according to claim 1, further comprising:
   detecting, as the electromechanical feedback signal, a surface velocity of at least one component of the link circuit capacitor.

4. The method according to claim 1, further comprising:
   detecting, as the electromechanical feedback signal, a displacement of at least one capacitor plate of the link circuit capacitor.

5. The method according to claim 1, further comprising:
   detecting, as the electromechanical feedback signal, a sound emitted by the link circuit capacitor.

6. The method according to claim 1, further comprising:
   predefining the carrier frequency of the at least one current such that it is different from a second carrier frequency of a second current fed to the electrical machine, and such that it is different from an integer multiple of the second carrier frequency.

7. The method according to claim 1, further comprising:
   determining at least two currents fed to the electrical machine,
   wherein different carrier frequencies are predefined for the at least two currents, such that the signal component associated with each respective current of the at least two currents is identified in the feedback signal on the basis of the respective carrier frequency.

8. The method according to claim 1, further comprising:
   determining, as the at least one current, an excitation current for energizing a rotor of the electrical machine of the drive system, wherein the electrical machine is a separately excited machine.

9. The method according to claim 1, further comprising:
   determining, as the at least one current, at least one phase current for energizing a stator phase of a stator of the electrical machine.

10. The method according to claim 9, further comprising:
    measuring, by a current sensor, the at least one measured phase current; and
    comparing the measured phase current with at least one determined phase current determined on the basis of the feedback signal.

11. The method according to claim 9, further comprising:
    measuring, by a current sensor, a first phase current;
    determining a second phase current using the feedback signal;
    calculating a calculated third phase current from the first phase current and the second phase current;
    determining a determined third phase current using the feedback signal; and
    comparing the calculated third phase current with the determined third phase current.

12. A drive system for a motor vehicle comprising:
    at least one electrical machine;
    a link circuit comprising a link circuit capacitor, the link circuit being coupled to the at least one electrical machine; and
    a control device configured to:
        regulate at least one current fed to the electrical machine via the link circuit;
        detect an electromechanical feedback signal dependent on the at least one current at the link circuit capacitor;
        identify a signal component associated with the at least one current in the feedback signal on a basis of a predefined carrier frequency of the at least one current; and
        determine the at least one current on the basis of the signal component.

13. The drive system according to claim 12, further comprising:
a sensor arranged at the link circuit capacitor, the sensor comprising at least one of an acceleration sensor or a microphone,
wherein the sensor is configured to detect, as the electromechanical feedback signal, at least one of an acceleration of at least one capacitor plate of the link circuit capacitor, a surface velocity of at least one component of the link circuit capacitor, a displacement of at least one capacitor plate of the link circuit capacitor, or a sound emitted by the link circuit capacitor.

14. The drive system according to claim 12, wherein the predefined carrier frequency of the at least one current is predefined such that it is different from a second carrier frequency of a second current fed to the electrical machine, and such that it is different from an integer multiple of the second carrier frequency.

15. The drive system according to claim 12, wherein the control device is further configured to:
determine at least two currents fed to the electrical machine,
wherein different carrier frequencies are predefined for the at least two currents, such that the signal component associated with each respective current of the at least two currents is identified in the feedback signal on the basis of the respective carrier frequency.

16. The drive system according to claim 12, wherein the control device is further configured to:
determine, as the at least one current, at least one of an excitation current for energizing a rotor of the electrical machine of the drive system, or at least one phase current for energizing a stator phase of a stator of the electrical machine,
wherein the electrical machine is a separately excited machine.

17. The drive system according to claim 16, further comprising:
a current sensor configured to measure the at least one phase current,
wherein the control device is further configured to:
compare the measured phase current with at least one determined phase current determined on the basis of the feedback signal.

18. The drive system according to claim 16, further comprising:
a current sensor configured to measure a first phase current,
wherein the control device is further configured to:
determine a second phase current using the feedback signal;
calculate a calculated third phase current from the first phase current and the second phase current;
determine a determined third phase current using the feedback signal; and
compare the calculated third phase current with the determined third phase current.

19. A motor vehicle comprising the drive system according to claim 12.

20. A motor vehicle comprising the drive system according to claim 13.

* * * * *